(12) United States Patent
 Smith et al.

(10) Patent No.: US 10,899,667 B2
(45) Date of Patent: Jan. 26, 2021

(54) COVALENTLY CROSS-LINKED LIGNOCELLULOSIC COMPOSITES AND APPLICATIONS THEREOF

(71) Applicant: Clemson University Research Foundation, Clemson, SC (US)

(72) Inventors: Rhett C. Smith, Clemson, SC (US); Andrew G. Tennyson, Clemson, SC (US)

(73) Assignee: Clemson University, Clemson, SC (US)

( * ) Notice: Subject to any disclaimer, the term of this patent is extended or adjusted under 35 U.S.C. 154(b) by 76 days.

(21) Appl. No.: 15/990,188

(22) Filed: May 25, 2018

(65) Prior Publication Data

US 2018/0354853 A1    Dec. 13, 2018

Related U.S. Application Data

(60) Provisional application No. 62/511,713, filed on May 26, 2017.

(51) Int. Cl.
| | |
|---|---|
| *C04B 26/00* | (2006.01) |
| *C04B 26/28* | (2006.01) |
| *C04B 28/02* | (2006.01) |
| *C04B 18/02* | (2006.01) |
| *C04B 14/06* | (2006.01) |

(Continued)

(52) U.S. Cl.
CPC .......... *C04B 26/285* (2013.01); *C04B 14/06* (2013.01); *C04B 18/021* (2013.01); *C04B 18/022* (2013.01); *C04B 26/28* (2013.01); *C04B 28/02* (2013.01); *C04B 2103/0062* (2013.01); *C04B 2111/0075* (2013.01); *C04B 2111/00646* (2013.01)

(58) Field of Classification Search
None
See application file for complete search history.

(56) References Cited

U.S. PATENT DOCUMENTS

| | | | | |
|---|---|---|---|---|
| 2,524,399 A | * | 10/1950 | Schoene ................. | C08B 11/04 8/120 |
| 4,244,728 A | * | 1/1981 | DelliColli ............... | C08H 6/00 504/188 |

(Continued)

OTHER PUBLICATIONS

Al-hadidy Al et al, starch as a modifier for asphalt paving materials, construction and building materials, 25, pp. 14-20 (Year: 2011).*

(Continued)

*Primary Examiner* — Stefanie J Cohen
(74) *Attorney, Agent, or Firm* — J. Clinton Wimbish; Nexsen Pruet, PLLC

(57) ABSTRACT

In one aspect, composite polymeric composition and related materials are described herein employing waste products from the agricultural and energy industries. Such composite polymeric compositions and materials can repurpose agricultural and petroleum waste products for various applications including, but not limited to, building and/or infrastructure materials. In some embodiments, a composite polymeric composition described herein comprises polysaccharides, lignin or combinations thereof covalently cross-linked via linkages comprising sulfur.

15 Claims, 7 Drawing Sheets

(51) Int. Cl.
  *C04B 111/00* (2006.01)
  *C04B 103/00* (2006.01)

(56) References Cited

U.S. PATENT DOCUMENTS

| | | | | |
|---|---|---|---|---|
| 4,857,638 | A * | 8/1989 | Yalpani | C08H 6/00 530/505 |
| 2006/0071364 | A1* | 4/2006 | Zenpo | B22C 15/23 264/219 |
| 2006/0258546 | A1* | 11/2006 | Brannon | C09K 8/80 507/269 |
| 2007/0066482 | A1* | 3/2007 | Thijssen | A01N 3/02 504/115 |
| 2012/0003283 | A1* | 1/2012 | Weiss | A61K 9/0019 424/400 |
| 2012/0309246 | A1* | 12/2012 | Tseitlin | C08L 3/04 442/180 |
| 2013/0195739 | A1* | 8/2013 | Bode | C01F 7/145 423/122 |

OTHER PUBLICATIONS

Xie et al, Lignin as Renewable and Superior Asphalt Binder Modifier, ACS sustainable chemistry and engineering, , 5, 2817-2823, Mar. 2017. (Year: 2017).*

* cited by examiner

5% functionalized cellulose
95% S$_8$
(1 1/2 months post synthesis)

5% functionalized cellulose
95% S$_8$
(remelted)

50% composite
$\begin{pmatrix} 5\% \text{ functionalized cellulose} \\ 95\% \text{ S}_8 \end{pmatrix}$ 50% sand

COVALENTLY CROSS-LINKED LIGNOCELLULOSIC COMPOSITES AND APPLICATIONS THEREOF

RELATED APPLICATION DATA

The present application claims priority pursuant to 35 U.S.C. § 119(e) to U.S. Provisional Patent Application Ser. No. 62/511,713 filed May 26, 2017 which is incorporated herein by reference in its entirety.

FIELD

The present invention relates to composite materials and, in particular, to composite materials comprising covalently cross-linked lignocellulosic composites.

BACKGROUND

Agriculture is the most essential human activity, but it is also perhaps the most environmentally damaging, given its negative impacts on the water, carbon, nitrogen, and phosphorus cycles as well as the appalling amount of waste it produces. Over five billion metric tons of pre-consumer lignocellulosic biowaste are produced annually. Nearly all major foodstuff crops grown on Earth produce significant quantities of biowaste (straw, corn cobs, rice hulls, etc.) for which there currently is no practical use, and which place an enormous burden on economy as well as ecology.

Whereas humans subsist on food, human civilization subsists on energy, the majority of which is currently supplied by combustion of coal and petroleum. Environmental regulations limit the sulfur content in gasoline to 10 ppm, and the petroleum industry removes 60 megatons (Mt) of sulfur per year, more than 7 Mt of which is unused and disposed of as waste. With the most accessible coal and petroleum sources becoming progressively depleted, humanity is increasingly reliant on less easily mined, more sulfur rich sources of petroleum such as oil sands (~5% sulfur) and sour natural gas (up to 45% $H_2S$). Accordingly, sulfur waste production continues to skyrocket. Millions of tons of elemental sulfur accumulated over the past two decades literally stand in mountainous piles of waste around the globe. In view of the foregoing problems, new solutions are required to reduce and/or repurpose waste stockpiles generated by the agricultural and energy industries.

SUMMARY

In one aspect, composite polymeric compositions and related materials are described herein employing waste products from the agricultural and energy industries. Such composite polymeric compositions and materials can repurpose agricultural and petroleum waste products for various applications including, but not limited to, building and/or infrastructure materials. In some embodiments, a composite polymeric composition described herein comprises polysaccharides covalently cross-linked via linkages comprising sulfur. Polysaccharides of the composite material, in some embodiments, are derived from lignocellulosic waste products. Moreover, sulfur of the cross-links can be derived from petroleum and/or other industrial waste products. In other embodiments, a composite polymeric composition comprises lignin polymers covalently cross-linked via linkages comprising sulfur. The cross-linked lignin polymers may form a matrix in which one or more chemical species may be stored or embedded. In some embodiments, the matrix can be porous with one or more chemical species stored or embedded in the pores. Cellulose, for example, can be embedded in pores of a matrix formed by covalently cross-linked lignin polymers. The cellulose within the pores can also be covalently cross-linked via linkages comprising sulfur. In further embodiments, the cellulose can also exhibit covalent cross-linking with the lignin polymers via linkages comprising sulfur.

In another aspect, composite materials are described herein employing polymeric composites. In some embodiments, a composite material comprises aggregate and binder for the aggregate, the binder comprising a composite polymeric composition including polysaccharides covalently cross-linked via linkages comprising sulfur. Alternatively, binder of the composite material can comprise lignin polymers covalently cross-linked via linkages comprising sulfur. In some embodiments, cellulose and/or other polysaccharides are present in the binder with the cross-linked lignin polymers. The cellulose and/or other polysaccharides may also be covalently cross-linked via linkages comprising sulfur. The cellulose and/or other polysaccharides, for example, may be covalently cross-linked with each other and/or with the lignin polymers. In other embodiments, the cellulose and/or other polysaccharides are not cross-linked.

In another aspect, methods of making composite polymeric compositions are described herein. In some embodiments, a method comprises providing a polysaccharide feedstock and functionalizing the polysaccharide feedstock with cross-linking moieties to provide substituted polysaccharides. Elemental sulfur is mixed with the substituted polysaccharides, and the substituted polysaccharides are cross-linked via linkages comprising sulfur. The elemental sulfur, for example, can be heated to temperatures sufficient to induce radical formation via ring opening of $S_8$. Sulfur radical can subsequently react with cross-linking moieties of the substituted polysaccharides to form linkages comprising sulfur.

In other embodiments, a method of making composite polymeric compositions comprises providing lignin feedstock and functionalizing lignin polymers of the feedstock with cross-linking moieties to provide substituted lignin polymers. Elemental sulfur is mixed with the substituted lignin polymers, and the substituted lignin polymers are cross-linked via linkages comprising sulfur. Cross-linking can occur as described above by forming sulfur radical species. In some embodiments, cellulose and/or other polysaccharides can be present with the substituted lignin polymer. The cellulose and/or other polysaccharides may also comprise moieties for covalent cross-linking with one another and/or cross-linking with the substituted lignin polymers. In other embodiments, the cellulose and/or other polysaccharides do not comprise cross-linking moieties. In such embodiments, the substituted lignin polymer is selectively covalently cross-linked in the presence of the cellulose and/or other polysaccharides.

In a further aspect, a method of making a composite polymeric composition comprises providing a lignocellulosic feedstock and functionalizing polysaccharides of the lignocellulosic feedstock with cross-linking moieties to provide substituted polysaccharides. Lignin polymers of the lignocellulosic feedstock are also functionalized with cross-linking moieties to provide substituted lignin polymers. Elemental sulfur is mixed with the substituted polysaccharides and substituted lignin polymers and the substituted polysaccharides and substituted lignin polymers are cross-linked via linkages comprising sulfur.

These and other embodiments are described further in the following detailed description.

DETAILED DESCRIPTION

Embodiments described herein can be understood more readily by reference to the following detailed description and examples and their previous and following descriptions. Elements, apparatus and methods described herein, however, are not limited to the specific embodiments presented in the detailed description and examples. It should be recognized that these embodiments are merely illustrative of the principles of the present invention. Numerous modifications and adaptations will be readily apparent to those of skill in the art without departing from the spirit and scope of the invention.

Figure 1:
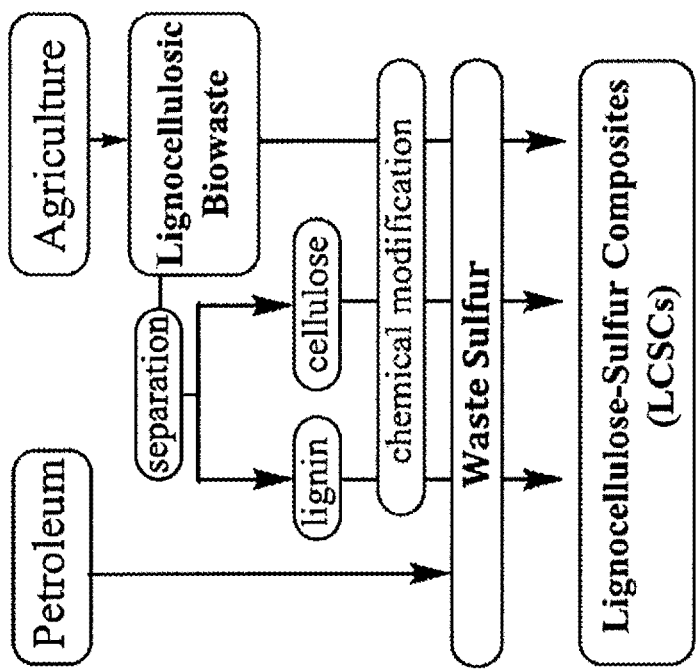
FIG. 1 illustrates a general schematic of producing lignocellulosic-sulfur composites according to some embodiments.

In one aspect, composite polymeric compositions and related materials are described herein employing waste products from the agricultural and energy industries. FIG. 1 illustrates a general schematic of producing lignocellulosic-sulfur composites according to some embodiments. As illustrated in FIG. 1, lignocellulosic biowaste can be processed to provide polysaccharide feedstock and/or lignin feedstock. Polysaccharides and/or lignin polymers of the feedstock are functionalized or chemically modified with cross-linking moieties enabling covalent linkage formation when combined with elemental sulfur to produce lignocellulosic-sulfur composites (LCSCs). The elemental sulfur can be sourced from sulfur waste resulting from mining and/or refining processes, such as those employed in the petroleum industry, as well as from biological or other natural resources.

In some embodiments, for example, a composite polymeric composition described herein comprises polysaccharides covalently cross-linked via linkages comprising sulfur. The cross-linked polysaccharides, in some embodiments, are formed of cellulose, cellulose derivative(s) or mixtures thereof. In other embodiments, polysaccharides can be selected from the group consisting of one or more hemicelluloses, amylose, amylopectin or mixtures thereof.

Figure 2:
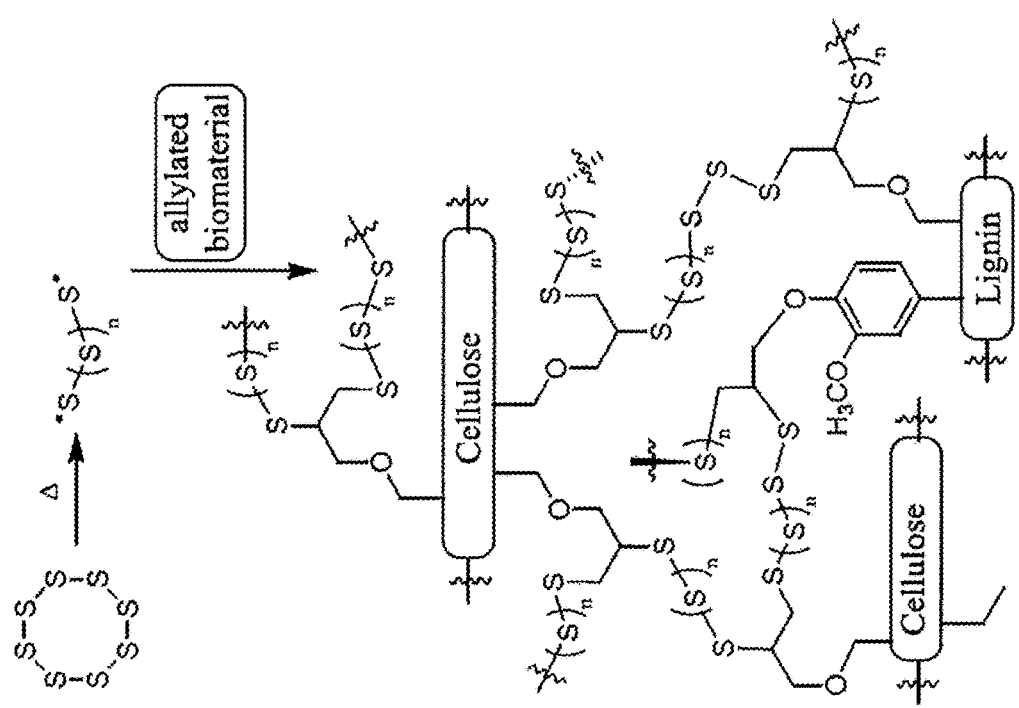
FIG. 2 illustrates cross-linking between cellulose and lignin polymer via linkages comprising sulfur according to some embodiments.

In another aspect, a composite polymeric composition comprises lignin polymers covalently cross-linked via linkages comprising sulfur. The cross-linked lignin polymers may form a porous matrix in which one or more chemical species may be stored or embedded. In some embodiments, cellulose and/or other polysaccharides can be embedded in pores of a matrix formed by covalently cross-linked lignin polymers. The cellulose and/or other polysaccharides within the pores, in some embodiments, are not cross-linked. In other embodiments, the cellulose and/or other polysaccharides in the matrix pores exhibit covalently cross-linking via linkages comprising sulfur. The cross-linking may exist between polysaccharides and/or between polysaccharides and lignin polymers. FIG. 2 illustrates cross-linking between cellulose and lignin polymer via linkages comprising sulfur according to some embodiments. By forming covalent cross-links with cellulose, other polysaccharides and/or lignin, the sulfur is not leachable from the polymeric composites. The non-leachable nature of the sulfur content promotes stability of the polymeric composites in various environments and precludes pollution concerns. Non-leachable sulfur is a fundamental departure from prior building materials employing sulfur in non-bound form, where leaching was facile and problematic.

As described herein, polysaccharides and lignin polymers are functionalized with cross-linking moieties enabling formation of cross-linkages comprising sulfur. Polysaccharides and lignin polymers, in some embodiments, are functionalized with any cross-linking moieties operable for reaction with sulfur radicals. Sulfur-centered radicals can be formed by any process not inconsistent with the objectives of the present invention. Sulfur-centered radicals, for example, can be formed by thermal treatment of elemental sulfur. Thermal treatment of elemental sulfur can induce sulfur radical formation by $S_8$ ring opening. In some embodiments, suitable cross-linking moieties for functionalization of cellulose, other polysaccharides and/or lignin polymers comprise one or more points of unsaturation. One or more points of unsaturation include alkene groups or alkyne groups. For example, cellulose, other polysaccharides and/or lignin polymers can be allylated. In other embodiments, lignin polymers can be provided cross-linking moieties not available to cellulose and/or other polysaccharides. The presence of aromatic structures in lignin can permit expansion of available cross-linking moieties. In some embodiments, functionalization of lignin may be administered via electrophilic aromatic substitution mechanisms resulting in haloaromatic moieties. Haloaromatic moieties react with elemental sulfur to afford thioether linkages. Haloaromatic moieties comprise chloroaromatic moieties, bromoaromatic moieties and/or iodoaromatic moieties. Functionalizing lignin polymers with cross-linking moieties not available to polysaccharides can permit selective cross-linking of lignin polymers in the presence of cellulose and other polysaccharides.

Figure 3:
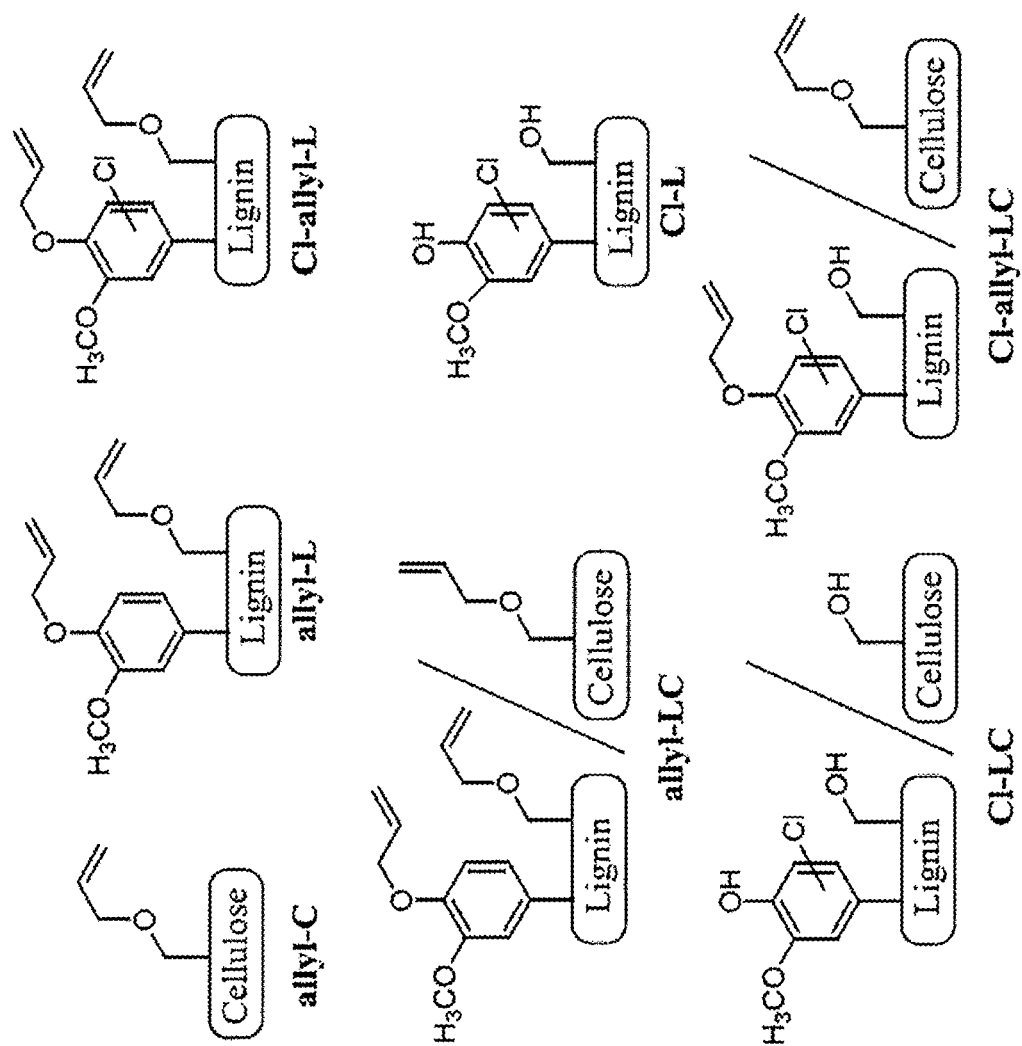
FIG. 3 illustrates cellulose and lignin polymers functionalized with various cross-linking moieties according to some embodiments.
Figure 4B:
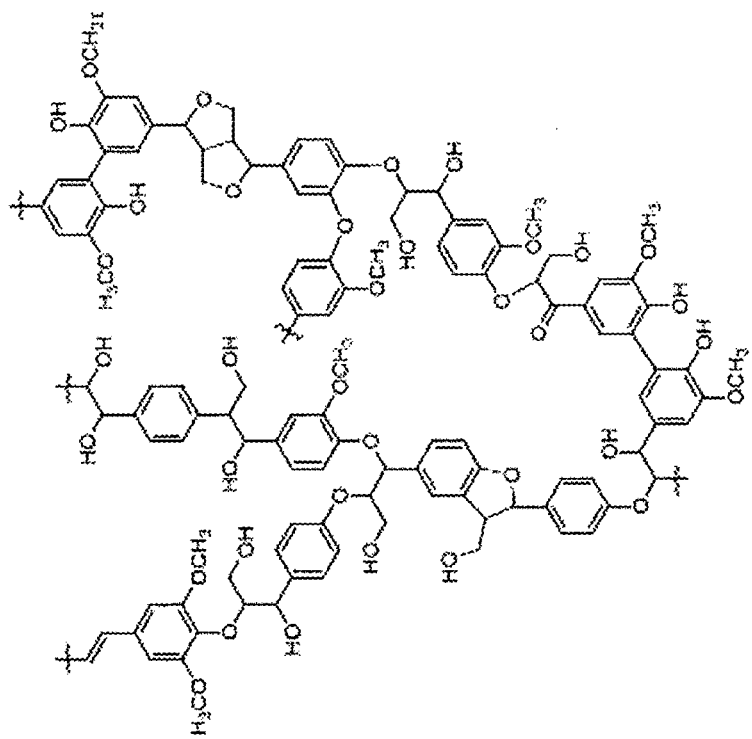
FIG. 4B illustrates a portion of lignin polymer according to some embodiments.
Figure 4A:
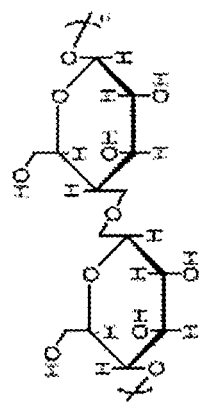
FIG. 4A illustrates structure of cellulose.
Figure 4C:
FIG. 4C illustrate $S_8$ ring opening to form sulfur centered radicals according to some embodiments.
Figure 4D:
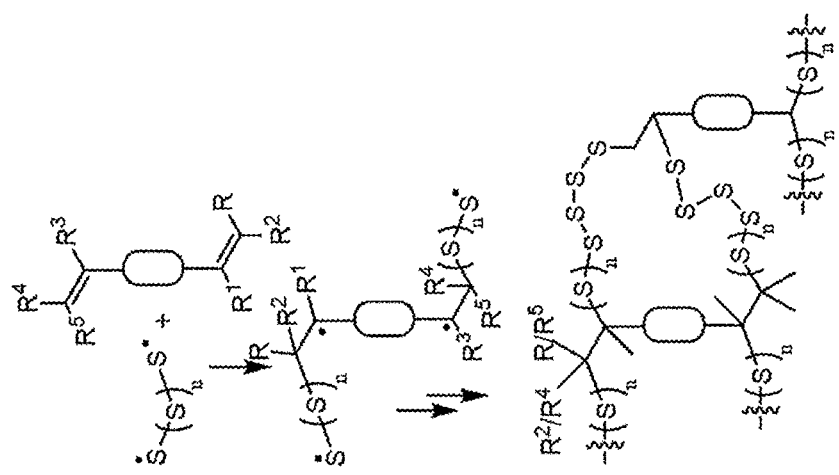
FIG. 4D illustrates cross-linking of functionalized polysaccharides and/or lignin via reaction of allyl functionalities with sulfur radicals according to some embodiments.

FIG. 3 illustrates cellulose and lignin polymers functionalized with various cross-linking moieties according to some embodiments. Table I defines the terminology used in FIG. 3.

TABLE I

Terminology of FIG. 3

| Term | Definition |
| --- | --- |
| allyl-C | allylated-cellulose |
| allyl-L | allylated-lignin polymer |
| allyl-LC | allylated lignocellulose |

TABLE I-continued

Terminology of FIG. 3

| Term | Definition |
|---|---|
| Cl-L | chlorinated lignin |
| Cl-LC | chlorinated lignin of lignocellulose |
| Cl-allyl-L | chlorinated and allylated lignin |
| Cl-allyl-LC | chlorinated and allylated lignin and allylated cellulose |

It can be seen from the functionalized species of FIG. 3 and Table I that various polymeric composites of specific constriction are possible. Combination of allyl-C with elemental sulfur, for example, provides cellulose cross-linked with linkages comprising sulfur. Table II provides a description of the remaining polymeric constructions formed from species of Table I in when combined with elemental sulfur.

TABLE II

Polymeric Composites

| Polymeric Composite | Definition |
|---|---|
| allyl-L LCSC | Cross-linked lignin via reaction of allyl groups with sulfur |
| allyl-LC LCSC | Cross-linked lignin and cellulose via reaction of allyl groups with sulfur |
| Cl-L LCSC | Cross-linked lignin via reaction of chloroaromatic groups with sulfur |
| Cl-LC LCSC | Selective cross-linking of lignin in the presence of cellulose via reaction of chloroaromatic groups with sulfur |
| Cl-allyl-L | Cross-linking of lignin via reaction of chloroaromatic and allyl groups with sulfur |
| Cl-allyl-LC | Cross-linking of lignin via chloroaromatic reaction and allyl reaction with sulfur and cross-linking of cellulose via allyl reaction with sulfur |

Sulfur content of polymeric composites described herein can be controlled according to the number of cross-linking sites afforded by the functionalized polysaccharides and/or lignin polymer. In some embodiments, the degree of functionalization of cellulose, other polysaccharides and/or lignin polymers can be at least 5%. Degree of functionalization can be determined according to the number of sites on the polysaccharide or lignin polymer that may accept a cross-linking moiety. In some embodiments, degree of functionalization of polysaccharides or lignin polymer has a value selected from Table III.

TABLE III

Degree of Polysaccharide or Lignin Polymer Functionalization

≥5%
≥10%
≥20%
≥50%
≥90%
10-90%
50-80%
50-90%

Degree of polysaccharide and/or lignin functionalization, in some embodiments, is 99% or 100%. Moreover, sulfur content of polymeric composites can generally track degree of functionalization. Polymeric composites, for example, can comprise sulfur in an amount selected from Table IV.

TABLE IV

Sulfur Content of Polymeric Composite

≥5%
≥10 wt. %
≥20 wt. %
≥50 wt. %
10-90 wt. %
50-90 wt. %
50-80 wt. %
5-99 wt. %

Amount of cross-linking in polymeric composites can be controlled by the degree of polysaccharide and/or lignin polymer functionalization. In this way, properties of the polymeric composites can be tailored to specific applications. A polymeric composite can have any desired ratio of functionalized polysaccharide and/or lignin to sulfur. In some embodiments, the ratio of functionalized polysaccharide and/or lignin to sulfur ranges from 1:99 to 99:1. Table V provides additional ratios.

TABLE V

Ratio of Functionalized Polysaccharide/Lignin to Sulfur

95:5 to 5:95
90:10 to 10:90
80:20 to 20:80
65:35 to 35:65
65:35 to 1:99
60:40 to 40:60
50:50

As described herein, composite polymeric compositions can be combined with various other components to form composite materials. In some embodiments, a composite material comprises aggregate and binder for the aggregate, the binder comprising a composite polymeric composition including polysaccharides covalently cross-linked via linkages comprising sulfur. In some embodiments, the polymeric composition further comprises lignin polymers covalently cross-linked via linkages comprising sulfur. Moreover, lignin polymers and polysaccharides can also be cross-linked with one another via linkages comprising sulfur. Alternatively, binder of a composite material can comprise lignin polymers covalently cross-linked via linkages comprising sulfur. In some embodiments, any of the polymeric composites described in Table II can be employed in binder of composite materials.

For building materials and/or roadway applications, aggregate of the composite material can comprise any desired component(s). Compositional components of the aggregate can be selected according to a variety of considerations including, but not limited to, desired mechanical and/or chemical properties of the composite material, specific architectural or roadway application for the composite material and compatibility of the components with the cross-linked binder. In some roadway applications, for example, the aggregate can comprise rock, sand, ceramics, refractory materials, gravel, recycled asphalt, recycled concrete or various mixtures thereof. Composite materials requiring high hardness and/or erosion resistance can employ aggregate comprising metal oxides, metal nitrides, metal carbides, metal carbonitrides, metal borides, alumina or various mixtures thereof.

In some embodiments, polymeric composites described herein can replace at least a portion of cement binder in concrete applications or bitumen in asphalt or roadway applications. In other embodiments, polymeric composites can completely replace cement binder and/or bitumen in concrete and asphalt respectively. Replacement of cement in concrete applications can save significant energy costs, as polymeric composites can be formed at substantially lower temperatures. Ring opening of $S_8$ can generally occur at temperatures of 130° C. to 230° C. Ring opening temperatures and subsequent composite formation can be governed by several considerations including, but not limited to, amount of sulfur, polysaccharide and/or lignin present in the reaction mixture, desired reaction rate and desired viscosity of the reaction mixture during polymeric composite formation. These lower temperatures are in sharp contrast to temperatures exceeding 1400° C. for cement production. Additionally, curing of polymeric composite materials completes in a matter of hours regardless of humidity and ambient temperature, whereas Portland cement requires 28 days to reach 90 percent of final strength, and curing is sensitive to temperature and humidity. Another limitation of existing cement technologies is porosity to water. Reinforced concrete, which typically contains reinforcing steel bars, is ubiquitous in construction applications. With existing cement technology, water can permeate through the concrete and induce galvanic reactions at the reinforcing steel bars, causing corrosion and weakening. Composite polymeric compositions described herein are highly hydrophobic and exhibit high water repellency, thus minimizing cause of structural material failure.

One limitation of existing asphalt technologies is the lack of reusability. Once asphalt has been cast onto a road, it is difficult to recycle the material. Although some processes allow cast asphalt to be broken into smaller pieces and reused, this approach still requires the use of new asphalt. In contrast, polymeric composite materials described here can be broken down, re-melted, and cast again into the desired shape. In some embodiments, used polymeric composite binder can be separated from used aggregate and redeposited with new aggregate. Another limitation of existing asphalt technologies is the susceptibility to cracking by the freeze-thaw cycle, wherein water enters the asphalt, and the expansion upon freezing causes damage. The highly hydrophobic nature of the composite polymeric compositions minimizes water absorption, thereby substantially reducing susceptibility to cracking by the freeze-thaw cycle.

Binder comprising polymeric composite material can be combined with aggregate in any desired ratio. Ratio between the binder and aggregate can be selected according to various considerations including, but not limited to, desired mechanical and/or chemical properties of the composite material, specific application in which the composite material will be used and compatibility of the components with the binder. In some embodiments, binder is present in the composite material in an amount of 5 to 95 weight percent or 10 to 90 weight percent. In some embodiments, composite materials comprising aggregate and binder including polymeric composite compositions described herein have one or more properties selected from Table VI.

TABLE VI

Properties of Composite Materials

| Property | Value |
|---|---|
| Tensile Strength | ≥400 psi |
| Compressive Strength | ≥4000 psi |
| Flexural Strength | ≥1000 psi |

TABLE VI-continued

Properties of Composite Materials

| Property | Value |
|---|---|
| Bond Strength | ≥150 psi |
| Water Absorption | ≤1.0 wt. % |
| Tendency of aggregate to settle | Variation from unity ≤0.6 |

Importantly, S—S bonds linking polysaccharide and/or lignin chains in the polymeric composites are thermally reversible upon heating, rendering the polymeric composites as thermoplastics. Thermoplastic materials are particularly attractive for sustainable construction applications because they can easily be recycled and reused by melt processing, and the existing industrial equipment for extrusion and compression/injection molding can be employed. In some embodiments, composite materials formed of recycled polymeric composite components can exhibit 100 percent of initial strength following multiple cycles of crush-extrude-recycling or melt-recycling processes. In other embodiments, the composite materials formed of recycled polymeric composite can exhibit at least 80 percent or at least 90 percent of initial strength following multiple cycles of crush-extrude-recycling or melt-recycling processes.

Polymeric composite materials can be produced according to the methods described above. Presence of cellulose and/or lignin with suitable cross-linking moieties can determine final compositional parameters of the polymeric composites in accordance with Table II above. Moreover, FIGS. 4A-D illustrate components and a general reaction scheme for producing polymeric composites according to some embodiments.

Polysaccharides and/or lignin polymers employed in the formation of polymeric composites described herein can be obtained from any source not inconsistent with the objectives of the present invention. In some embodiments, polysaccharides and lignin polymers are derived from biowastes originating from various sources, including the agricultural and timber industries. Biowaste sources can be processed to provide any combination of cellulose, hemicellulose, other polysaccharides, chitin and/or lignin. In some embodiments, biowaste sources are processed to provide cellulose alone, lignin alone or a combination of only cellulose and lignin. In some embodiments, lignocellulosic biowastes are dried and ground into powder, particles or otherwise ground state, which is then partitioned to defined particle size tolerances via mechanical sifting in a manner similar to processing wood particles in particle board production. The lignin can be removed from the flour by sequentially treating with oxidizing agents and alkaline solution, which provides the opportunity to assess the LCSC utility of either the lignocellulosic flour, the lignin alone, or the cellulose alone. Tolerances can be established for processed lignocellulosic biowastes permitting methods described herein to produce uniformity between batches of polymeric composites comprising covalently cross-linked polysaccharides and/or lignin. Uniformity in the polymeric composites concomitantly produces uniformity in composite materials incorporating the polymeric composites.

Figure 5A:
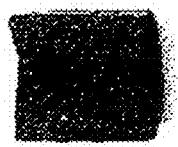
FIG. 5A illustrates a composite polymeric composition according to some embodiments.

FIG. 5A illustrates a composite polymeric composition comprising 5 wt. % allyl-functionalized cellulose and 95 wt. % sulfur ($S_8$). The cellulose was cross-linked via reaction of the allyl groups with sulfur radicals formed via ring opening of the $S_8$, as described herein. The composite polymeric composition exhibited high stability and no degradation under ambient environmental conditions for a period of at least 45 days. Moreover, the 5:95 composite polymeric composition exhibited a storage modulus of 1080 MPa. This was a dramatic increase over the 580 MPa storage modulus of elemental sulfur, thereby illustrating the enhancements provided by the presence of 5 wt. % cross-linked cellulose. The 5:95 composite polymeric composition also exhibited a break strength of 6.15N compared to 2.55N for elemental sulfur. The substantial increase in break strength is indicative of the presence of linear or open-ring polymer chains of sulfur in the composition. As described herein, such open-ring sulfur chains can serve as cross-links between the functionalized cellulose. These properties enable composite polymeric compositions to display greater elastic deformation and fracture resistance when under various mechanical stresses. The foregoing properties of the composite polymeric composition were determined by Dynamic Mechanical Analysis (DMA).

Figure 5B:
FIG. 5B illustrates a composite polymeric composition formed by melting and recasting the composite of FIG. 5A according to some embodiments.

FIG. 5B illustrates a composite polymeric composition formed by melting and recasting the composite of FIG. 5A according to some embodiments. The melting and recasting of the polymeric composite confirms the recyclable and/or reusable nature of the composite. Additionally, morphology of the melted and recast polymeric composite is substantially the same as the virgin composite, indicating little to no losses in mechanical properties due to the recycling process.

Figure 6:
FIG. 6 illustrates a composite polymeric composition according to some embodiments.

FIG. 6 illustrates a composite material including aggregate and polymeric composite according to some embodiments. In the embodiment of FIG. 6, the material comprised 50 wt. % sand aggregate and 50 wt. % polymeric composite. The polymeric composite was 5 wt. % functionalized cellulose and 95 wt. % sulfur. The allyl functionalized cellulose was cross-linked via ring opened sulfur radicals.

Various embodiments of the invention have been described in fulfillment of the various objectives of the invention. It should be recognized that these embodiments are merely illustrative of the principles of the present invention. Numerous modifications and adaptations thereof will be readily apparent to those skilled in the art without departing from the spirit and scope of the invention.

The invention claimed is:

1. A composite polymeric composition comprising:
lignin polymers covalently cross-linked via linkages comprising sulfur.

2. The composite polymeric composition of claim 1, wherein the cross-linked lignin polymers form a matrix.

3. The composite polymeric composition of claim 2 further comprising a biopolymer or synthetic polymer component embedded in the matrix.

4. The composite polymeric composition of claim 3, wherein the biopolymer component comprises one or more polysaccharides.

5. The composite polymeric composition of claim 4, wherein the one or more polysaccharides comprise cellulose, hemicellulose or mixtures thereof.

6. The composite polymeric composition of claim 4, wherein polysaccharide chains are covalently cross-linked via linkages comprising sulfur.

7. The composite polymeric composition of claim 6, wherein the polysaccharide chains are cross-linked with the lignin polymers via linkages comprising sulfur.

8. A composite material comprising:
aggregate; and
a binder for the aggregate, the binder comprising a composite polymeric composition including polysaccharides covalently cross-linked via linkages comprising sulfur, and lignin polymers covalently cross-linked via linkages comprising sulfur.

9. The composite material of claim 8, wherein the polysaccharides are formed of cellulose, cellulose derivative or mixtures thereof.

10. The composite material of claim 8, wherein the aggregate is present in an amount of 5 to 95 weight percent of the composite material.

11. The composite material of claim 8, wherein the lignin polymers and polysaccharides are cross-linked with one another via linkages comprising sulfur.

12. The composite material of claim 8, wherein the aggregate comprises rock, sand, gravel, ceramics, refractory material, recycled asphalt, recycled concrete or combinations thereof.

13. The composite material of claim 12, wherein the composite material is pavement or masonry.

14. The composite material of claim 12, wherein the binder further comprises cement.

15. The composite material of claim 8, wherein sulfur is present in an amount of 5 weight percent to 99 weight percent of the composite material.

* * * * *